(12) United States Patent
Heard

(10) Patent No.: US 7,412,843 B2
(45) Date of Patent: Aug. 19, 2008

(54) MANIFOLD-SUPERHEATED AIR CONDITIONING SYSTEM

(76) Inventor: Martin Perry Heard, 8012 Brentwood Ave., Lubbock, TX (US) 79424

( * ) Notice: Subject to any disclaimer, the term of this patent is extended or adjusted under 35 U.S.C. 154(b) by 327 days.

(21) Appl. No.: 11/282,598

(22) Filed: Nov. 21, 2005

(65) Prior Publication Data

US 2006/0260336 A1    Nov. 23, 2006

Related U.S. Application Data

(60) Provisional application No. 60/683,090, filed on May 20, 2005.

(51) Int. Cl.
*F25B 27/00* (2006.01)
(52) U.S. Cl. .................... 62/238.6
(58) Field of Classification Search ...... 62/238.6–238.7
See application file for complete search history.

(56) References Cited

U.S. PATENT DOCUMENTS

| 5,249,742 | A  | 10/1993 | Atterbury et al. |
| 5,457,964 | A  | 10/1995 | Hyde |
| 5,598,718 | A  | 2/1997  | Freund et al. |
| 5,910,159 | A  | 6/1999  | Matsuo et al. |
| 6,173,578 | B1 | 1/2001  | Al-Otaibi |
| 6,425,257 | B1 | 7/2002  | Ohseki et al. |
| 6,427,472 | B1 | 8/2002  | Nakagawa et al. |
| 6,467,300 | B1 | 10/2002 | Noble |
| 6,640,889 | B1 | 11/2003 | Harte et al. |
| 6,662,864 | B2 | 12/2003 | Burk et al. |
| 6,705,103 | B2 * | 3/2004 | Leuthner .................. 62/238.6 |
| 6,748,934 | B2 | 6/2004  | Natkin et al. |
| 6,796,134 | B1 | 9/2004  | Bucknell et al. |
| 6,807,820 | B2 * | 10/2004 | Aikawa et al. ............. 62/238.3 |
| 7,048,044 | B2 * | 5/2006 | Ban et al. ................... 165/202 |
| 7,152,422 | B2 * | 12/2006 | Takano et al. ............. 62/238.6 |
| 2005/0188711 | A1 * | 9/2005 | Wang et al. ................ 62/238.6 |

* cited by examiner

*Primary Examiner*—William E Tapolcai
(74) *Attorney, Agent, or Firm*—Hunton & Williams LLP

(57) ABSTRACT

The present invention involves a system and method for superheating the refrigerant gas in a motor vehicle air conditioning system in order to minimize the amount of work required to be performed by the compressor. In an embodiment of the present invention, the refrigerant gas is diverted through the exhaust manifold immediately after passing through the compressor. As the refrigerant gas passes through the exhaust manifold, it is superheated by the surrounding hot exhaust gases thereby increasing the refrigerant gas pressure to reduce the amount of work done by the compressor.

11 Claims, 5 Drawing Sheets

MANIFOLD-SUPERHEATED AIR CONDITIONING SYSTEM

BACKGROUND OF THE INVENTION (i) Field of the Invention

This invention relates to a device and method for superheating air conditioning refrigerant in a closed-loop air conditioning system, particularly an automotive air conditioning system.

(ii) Description of the Related Art

Air conditioning systems are almost universally sold with new automobiles, and it is well known that existing air conditioning systems substantially impact the fuel efficiency of motor vehicles. Improving the efficiency of air conditioning systems to conserve fuel is highly desirable, given the present high, rising costs of motor vehicle fuels as well as the general global environmental goals of reducing carbon dioxide emissions and other pollutants associated with the operation of motor vehicles. Motor vehicles generate large amounts of waste heat, which represents a significant fraction of the energy of combustion much of which is vented into the atmosphere through the operation of the exhaust manifold. Is it therefore highly desirable to utilize this heat to perform useful work, thereby preventing waste and improving the efficiency of motor vehicles.

In current vehicle air conditioning systems, the purpose of the compressor is to convert low-pressure, low-temperature refrigerant gas into high-pressure, high-temperature refrigerant gas before introducing the gas into a condenser, where it is cooled and converted into liquid refrigerant. In a typical closed-loop vehicle air conditioning system, the liquid refrigerant is then converted back to a gas in an evaporator. The expansion of the liquid into a gas results in cooling of the gas prior to its introduction into the passenger compartment of the vehicle. Through this closed cycle, refrigerant is continually recycled.

Typically, in a modern motor vehicle, the air conditioning compressor is linked to the drive shaft through a belt or other linking means, and the operation of the compressor is thereby operated by the direct application of work through the drive shaft. This system requires the combustion of fuels to provide the work necessary to operate the compressor. In these systems, the operation of the compressor can impact the fuel efficiency of a vehicle by as much as fifteen to twenty-five percent. It has been observed that in automobiles that have no automatic mechanism for increasing the energy consumption of the engine when the air conditioning system is activated that the revolutions-per-minute (rpm) may decrease as much as 25% when the compressor is activated.

SUMMARY OF THE INVENTION

The present invention involves a system and method for superheating the refrigerant gas in a motor vehicle air conditioning system in order to minimize the amount of work required to be performed by the compressor. In an embodiment of the present invention, the refrigerant gas is diverted through the exhaust manifold immediately after passing through the compressor. As the refrigerant gas passes through this tube passing through the exhaust manifold, it is superheated by the surrounding hot exhaust gases. In addition to being heated, by operation of Charles' and Boyle's laws, the refrigerant gas's pressure is also increased substantially. By this method, the work required to be done by the compressor is substantially reduced. The present invention therefore successfully harnesses what would otherwise be waste heat vented through the vehicles exhaust system to perform useful work by assisting the compressor, thereby reducing the load on the vehicle's drive shaft and similarly reducing the vehicle's necessary consumption of fuel.

In one embodiment, the closed air conditioning loop may be maintained by providing two holes in the forward and rear portion of an exhaust manifold that are connected to each other through means of a tube of approximately the same diameter as standard steel vehicle air conditioning tubing. Such arrangement provides convenient heating of the refrigerant fluid. By connecting the two holes in the manifold and using standard tubing, the structural integrity of the manifold is also maintained. This arrangement permits a convenient means for modifying vehicles that were designed without a means for heat exchange in the refrigerant system. The invention may be implemented using more elaborate heat exchange means that provide increased heat transfer area. In particular original equipment and aftermarket exhaust manifolds may be provided with means for heat exchange with the refrigerant fluid having an array of options for the amount of heat exchange area between the exhaust gas and the refrigerant fluid.

In certain applications, the increase in efficiency of the air conditioning system may permit the use of an electric compressor operated by the vehicle's standard twelve-volt electrical system.

DETAILED DESCRIPTION OF PREFERRED EMBODIMENTS

Figure 1:
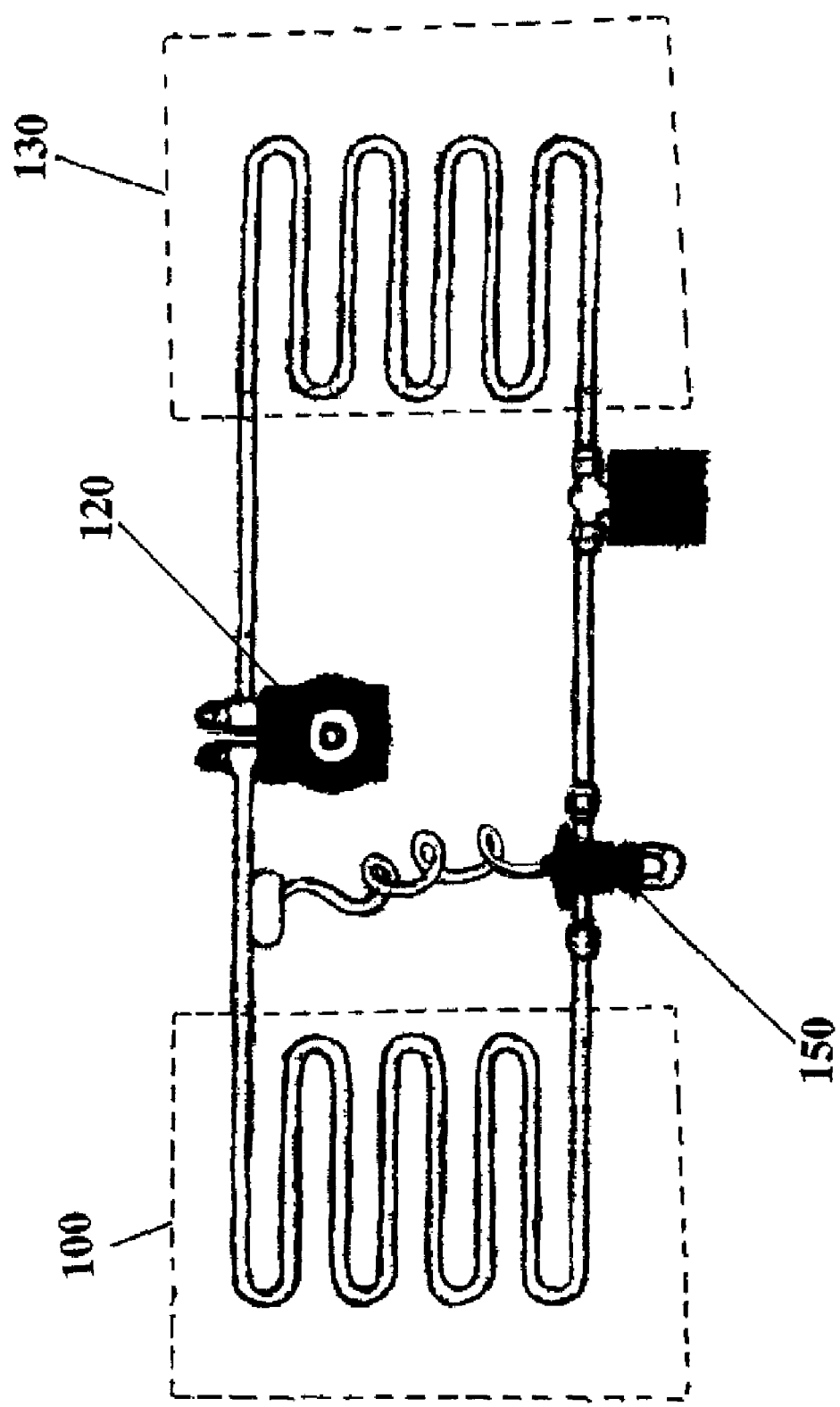
FIG. 1 is a schematic diagram of an existing orifice tube vehicle air conditioning system.
Figure 2:
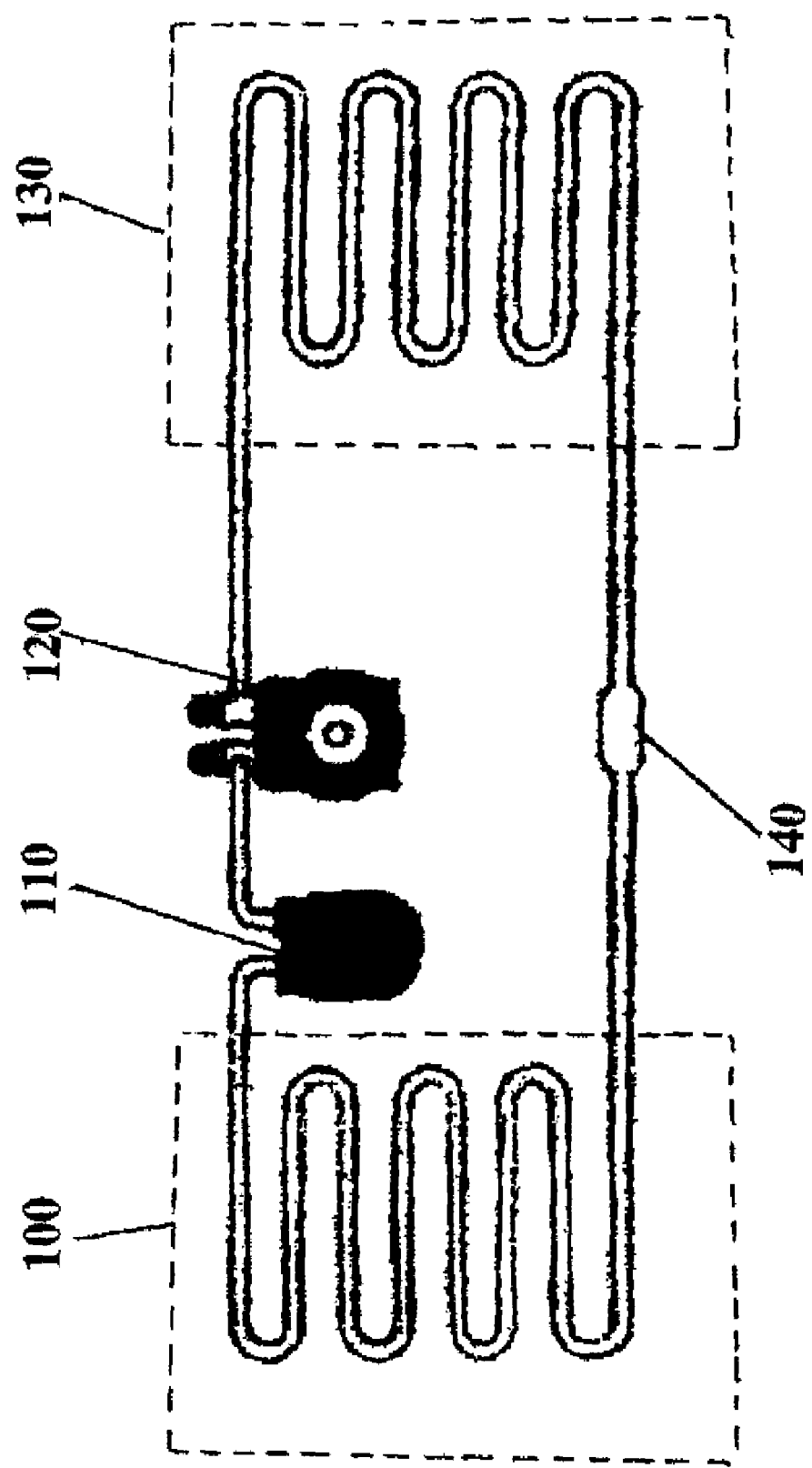
FIG. 2 is a schematic diagram of an existing thermostatic expansion valve vehicle air conditioning system.

FIGS. 1 and 2 illustrate typical closed-loop air conditioning systems containing a refrigerant fluid which is continuously recycled. In such a system, refrigerant fluid in liquid phase is initially converted to gas phase by evaporation inside an evaporator 100. Depending on the type of system being used, the refrigerant gas may then pass through an accumulator 110 prior to entering the system's compressor 120. After being converted from low temperature, low-pressure gas into high-temperature, high-pressure gas by the compressor 120, the refrigerant fluid then enters a condenser 130, where the fluid changes from gas phase back into liquid phase. The liquid refrigerant fluid is then returned either through a fixed orifice tube 140 or through a thermostatic expansion valve 150, depending on the type of system, to the evaporator 100 to begin the cycle over again. These types of systems are well-understood by those in the art.

In such present systems, the compressor 120 is required to perform substantial work on the refrigerant fluid to increase its temperature and pressure. The compressor 120 is typically rotationally driven by linkage to the vehicle engine 200 by belt or other linking means, and the torque require to rotatably drive the compressor 120 comprises a substantial burden on the vehicle's engine 200, requiring the use of a substantial portion of the engine's torque output and concomitantly impacts the required fuel consumption of the vehicle by as much as twenty-five percent. It has been observed that in automobiles that have no automatic mechanism for increasing the energy consumption of the engine when the air conditioning system is activated that the revolutions-per-minute (rpm) may decrease as much as 25% when the compressor is activated.

Figure 3:
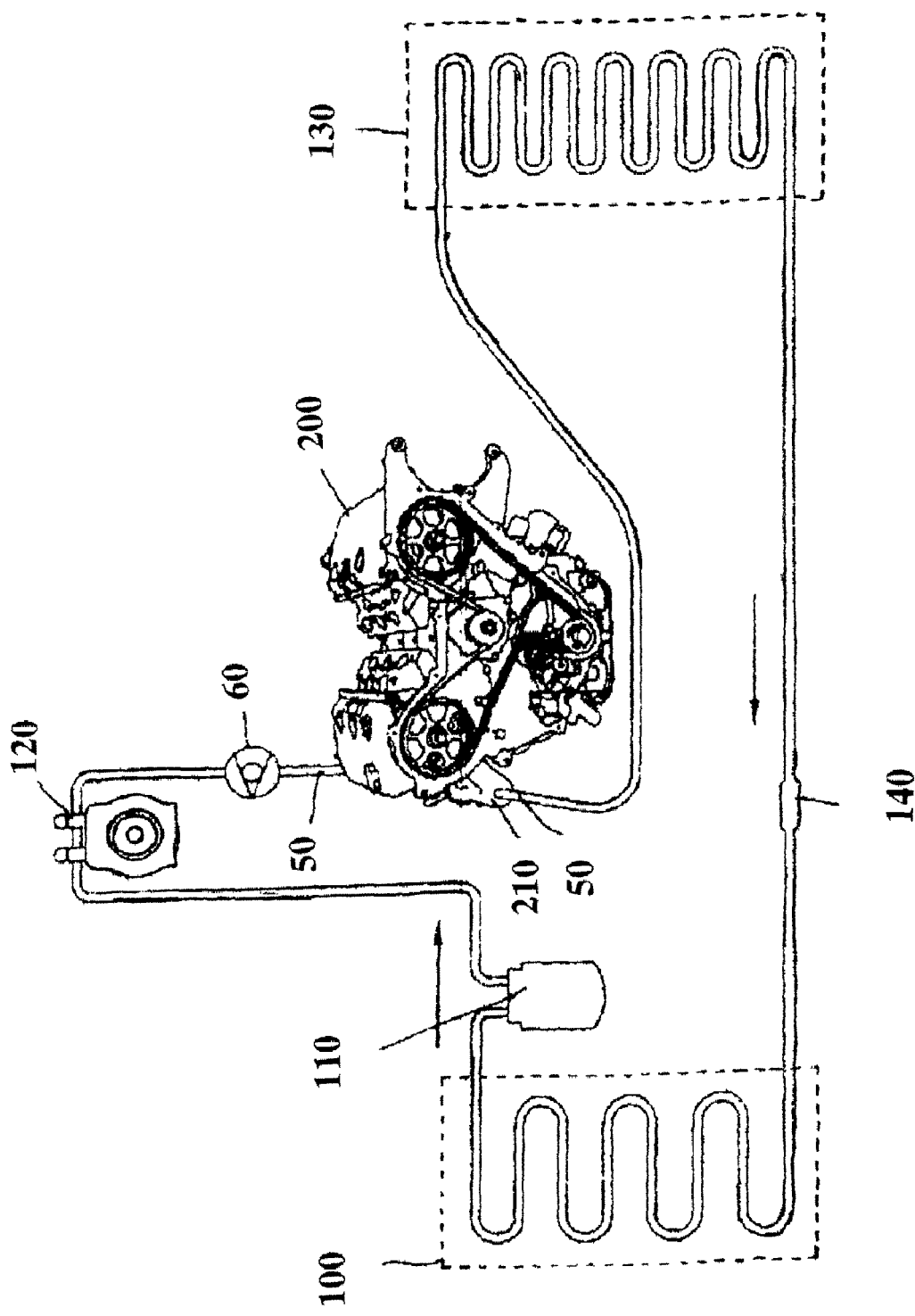
FIG. 3 is a schematic diagram of an orifice tube vehicle air conditioning system according to an embodiment of the invention.
Figure 4:
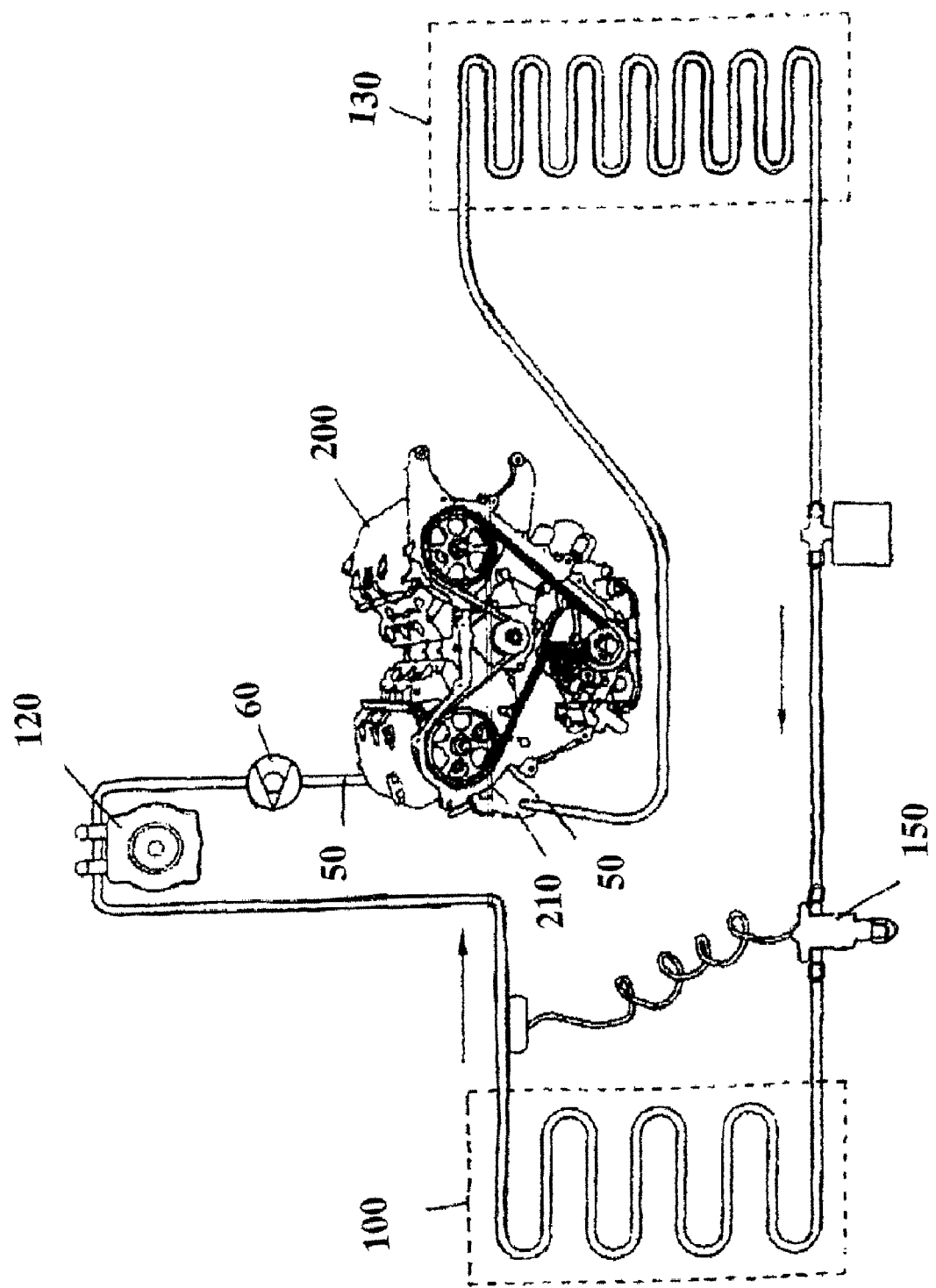
FIG. 4 is a schematic diagram of a thermostatic expansion valve vehicle air conditioning system according to an embodiment of the invention.
Figure 5:
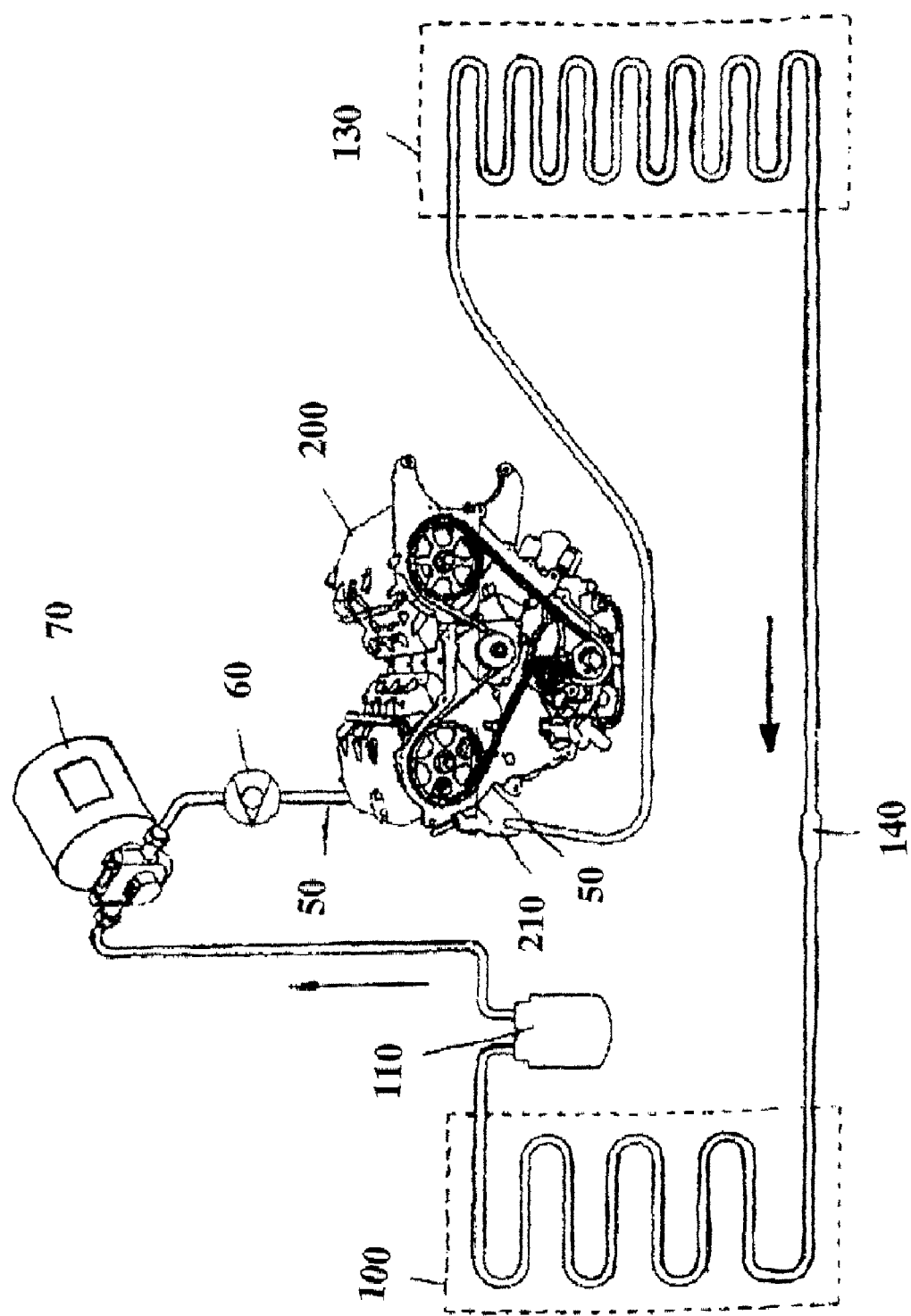
FIG. 5 is a schematic diagram of an orifice tube vehicle air conditioning system including an electric compressor according an embodiment of the invention.

Referring to FIGS. 3, 4, and 5, the present invention improves on existing air conditioning systems by including modifications to utilize the waste heat generated by the vehicle engine 200 to reduce the burden on the compressor 120 and hence also reduce the load placed on the vehicle engine 200. These modifications therefore result in substantial savings in fuel and an overall more efficient vehicle.

FIG. 3 depicts a view of one embodiment of the invention. A vehicle engine 200 typically includes a manifold 210 in which hot exhaust gases created by the combustion of fuel in the engine 200 are accumulated prior to being removed from the vehicle by the exhaust system. In the ordinary course of a vehicle's operation, the measured temperature of the manifold 210 varies depending on the load placed upon the engine 200, generally represented by the revolutions per minute of the engine's drive shaft. For example, in a typical system, an engine 200 idling at 750 revolutions per minute (rpm) has been observed to have a manifold temperature of approximately 450 degrees Fahrenheit, and at 2,000 rpm of approximately 565 degrees Fahrenheit. Ordinarily, this heat represent waste energy which is lost to the environment through the exhaust system as well as through the engine's ordinary cooling systems. However, as shown in FIGS. 3, 4, and 5, the present system utilizes this heat to superheat the air conditioning system's refrigerant liquid, thus performing a substantial portion of the work ordinarily performed by the compressor 120.

In one embodiment of the invention, two holes are provided in the manifold 210 which are connected within the manifold by a manifold tube 50, which consists of ordinary steel air conditioning tubing. The outer surface of the tube 50 is connected around its outer circumference at either end to the inner surface of the holes by welding or other attachment means which will be understood to those in the art. The manifold tube 50 therefore passes through the manifold 210 while maintaining the manifold's integrity as a containment vessel for exhaust gases. The output tube 122 running from the vehicle's compressor 120 is connected to a one-way check valve 60, which is then connected to the manifold tube 50. The check valve 60 prevents high-pressure gas or liquid refrigerant fluid from flowing back to the compressor. The manifold tube 50 is then connected to the condenser 130. As shown in FIGS. 3 and 4, the present invention may be practiced by modifying a vehicle existing air conditioning system, using the vehicle's original equipment compressor 120.

In one embodiment, the vehicle's original equipment compressor 120 is replaced with an electric compressor 70 powered by the vehicle's standard 12 V electrical system as shown in FIG. 5.

While the invention may be implemented by modifying an original equipment manifold that is sold without any mechanism for heat exchange with refrigerant fluid, the invention can also be implemented by designing an exhaust manifold having such a heat exchange mechanism built in. It is anticipated that new manifolds could be developed with a larger heat exchange surface area in a newly designed manifold. For example, instead of passing a tube through a manifold, a manifold could be molded out of metal having a first cavity for exhaust and a second cavity for refrigerant fluid such that heat is exchanged between the exhaust and the refrigerant fluid. The molded manifold would preferably be constructed in one-piece using a single mold and having external connections for attachment of a refrigerant fluid inlet and a refrigerant fluid outlet.

As noted previously, the exact temperature of the manifold 210 is dependent upon the particular vehicle and its current operating conditions. In a typical system in which observations have been conducted, with an engine 200 idling at approximately 750 rpm, the manifold has been observed to have a temperature of approximately 450 degrees Fahrenheit. Under these conditions, the refrigerant fluid has been observed to have a temperature at the input to the manifold tube 50 of approximately 130 degrees Fahrenheit and an output temperature of approximately 200 degrees Fahrenheit. With the engine 200 operating at approximately 2,000 rpm (representing an ordinary operational vehicle speed), the manifold 210 has been observed to have a temperature of approximately 565 degrees Fahrenheit. Under these operational conditions, the refrigerant fluid has been observed to have a temperature at the input to the manifold tube 50 of approximately 134 degrees Fahrenheit, and a temperature at the output of approximately 270 degrees Fahrenheit. It has been observed in a motor vehicle not having the system described above and without an automatic mechanism for increasing the energy consumption of the engine when the air conditioning system is activated that the revolutions-per-minute (rpm) may decrease as much as 25% when the compressor is activated. After that same system has been modified as described above, no such decrease in the revolutions-per-minute of the engine is detected when the compressor is activated. Although not wishing to be bound to a particular operational principle or theory, it is believed that the majority of the temperature and pressure increase of the refrigerant fluid gas required prior to condensation is performed by passing the refrigerant through the manifold thereby decreasing the amount of work done by the compressor. Under these conditions, it is believed that the compressor 120 or electric compressor 70 acts primarily as a pump to move the refrigerant fluid through the system.

These and other benefits of the present invention will be apparent to those having ordinary skill in the art. Furthermore, persons with ordinary skill in the art will understand the various parts forming the present invention and will understand their methods of manufacture, and the methods of connecting them to form the complete invention. While the preferred embodiment has been described, it will furthermore be understood that various changes can be made therein without departing from the spirit and scope of the invention.

What is claimed is:

1. A closed-loop air conditioning system comprising:
   an evaporator for converting a working fluid to a gas;
   a compressor for increasing the pressure of the working fluid;
   a first working fluid line between the compressor and the evaporator;
   a condenser for converting the working fluid to a liquid;
   a second working fluid line between the compressor and the condenser, a first portion of the second fluid line being positioned with respect to at least one exhaust manifold such that heat is transferred from the exhaust gas in the manifold to the working fluid for increasing the pressure of the working fluid; and
   a third working fluid line between the condenser and the evaporator.

2. The closed-loop air conditioning system of claim 1, wherein the at least one exhaust manifold comprises a first opening and a second opening for passing the working fluid through the manifold.

3. The closed-loop air conditioning system of claim 2, wherein the first portion of the second working fluid line passes through the first opening and the second opening.

4. The closed-loop air conditioning system of claim 1, further comprising an accumulator, wherein the first working fluid line includes a first portion between the evaporator and the accumulator and a second portion between the accumulator and the compressor.

5. The closed-loop air conditioning system of claim 1, further comprising an expansion valve wherein the third working fluid line includes a first portion between the condenser and the expansion valve and a second portion between the expansion valve and the evaporator.

6. The closed-loop air conditioning system of claim 1, further comprising a fixed orifice tube wherein the third working fluid line includes a first portion between the condenser and the fixed orifice tube and a second portion between the fixed orifice tube and the evaporator.

7. The closed-loop air conditioning system of claim 1, further comprising a check valve wherein the second working fluid line includes a second portion between the check valve and the compressor and a third portion between the check valve and first portion of the second fluid line.

8. The closed-loop air conditioning system of claim 1, wherein the compressor is an electric compressor.

9. The closed-loop air conditioning system of claim 1, wherein a fourth portion of the second fluid line is positioned with respect to a second exhaust manifold such that heat is transferred between exhaust gas in the second manifold and the working fluid for increasing the pressure of the working fluid.

10. The closed-loop air conditioning system of claim 1, wherein the first portion of the second fluid line is an internal passage in a molded exhaust manifold.

11. A closed-loop air conditioning system comprising:
an evaporator for converting a working fluid to a gas;
a compressor for increasing the pressure of the working fluid;
a first working fluid line between the compressor and the evaporator;
a condenser for converting the working fluid to a liquid;
a second working fluid line between the compressor and the condenser, a first portion of the second fluid line being positioned with respect to at least one exhaust manifold such that heat is transferred from the exhaust gas in the manifold to the working fluid for increasing the pressure of the working fluid;
a check valve between the compressor and the exhaust manifold, the second working fluid line including a second portion between the check valve and the compressor and a third portion between the check valve and first portion of the second fluid line; and
a third working fluid line between the condenser and the evaporator.

* * * * *